United States Patent
Cedervall et al.

(10) Patent No.: US 7,092,463 B1
(45) Date of Patent: Aug. 15, 2006

(54) METHOD AND APPARATUS FOR INTERFERENCE REJECTION

(75) Inventors: Mats Cedervall, Täby (SE); Bo Göransson, Stockholm (SE); Joakim Sorelius, Uppsala (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/549,559

(22) Filed: Apr. 14, 2000

(30) Foreign Application Priority Data

Apr. 16, 1999 (SE) .................................... 9901384

(51) Int. Cl.
*H03D 1/04* (2006.01)

(52) U.S. Cl. .................... 375/346; 375/232; 375/284; 375/350; 84/661; 455/296

(58) Field of Classification Search ................ 375/346, 375/336, 340, 232, 284, 350; 455/302, 296; 84/661

See application file for complete search history.

(56) References Cited

U.S. PATENT DOCUMENTS 5,432,821 A * 7/1995 Polydoros et al. .......... 375/340
5,848,105 A * 12/1998 Gardner et al. ............. 375/336
6,314,147 B1 * 11/2001 Liang et al. ................ 375/346

FOREIGN PATENT DOCUMENTS

EP 0782260 A2 6/1997
WO WO97/11544 3/1997
WO WO98/16021 4/1998

OTHER PUBLICATIONS

P.R. Chevillat, et al., "Noise-Predictive Partial-Response Equalizers and Applications", IBM Research Division, Suprercomm/ICC '92, published on Jun. 14, 1992, pp. 942-947.

David W. Lin, et al., " Receiver Optimization for Dispersive Channels Employing Coded Modulation, with Application in High Rate Digital Subscriber Line Transmission", IEEE International Conference on Communications ICC '90, Apr. 15-19, 1990, pp. 1742-1746.

Terence Wang, et al., "Improved Adaptive Decision-Feedback Equalization with Interleaving for Coded Modulation Systems", Proceedings of the Global Telecommunications Conference, published on Nov. 28, 1994, pp. 6-10.

F. Hendessi, et al., "The Structure and Performance of FRESH-Decision Feedback Equalizer in the Presence of Adjacent Channel Interference", Proceedings of the Vehicular Technology Conference, IEEE, vol. Conf. 43, May 18-20, 1993, pp. 641-644.

* cited by examiner

*Primary Examiner*—Khai Tran
*Assistant Examiner*—Edith Chang
(74) *Attorney, Agent, or Firm*—Roger Burleigh

(57) ABSTRACT

The invention relates to an apparatus, and an associated method, in a communication system that is tolerant to interference. The received signal is divided into a real and an imaginary part, and the noise and interference is modeled as a filtered process. The invention solves the interference problem by utilizing the inherent signal structure.

5 Claims, 2 Drawing Sheets

METHOD AND APPARATUS FOR INTERFERENCE REJECTION

Figure 1:
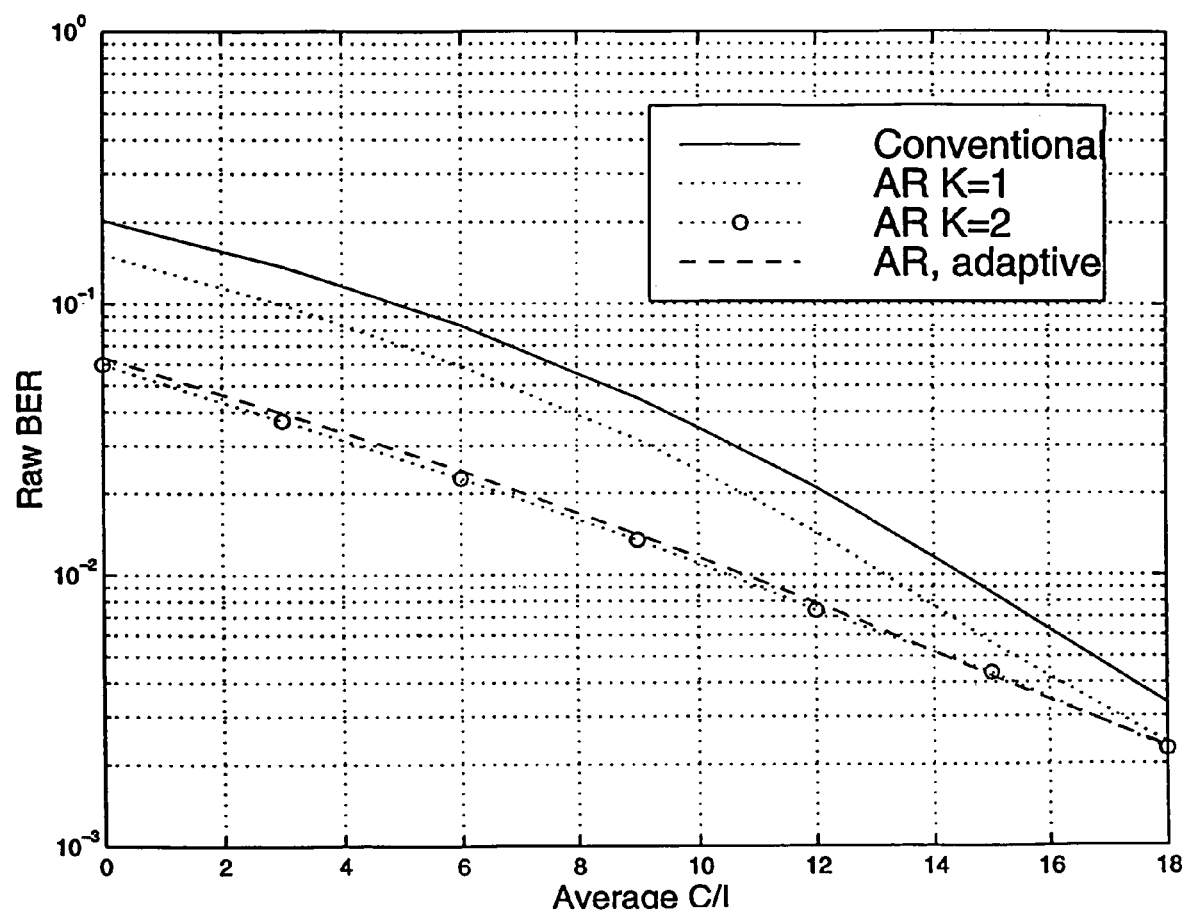

This application claims priority under 35 U.S.C. §§119 and/or 365 to 9901384-9 filed in Sweden on Apr. 16, 1999; the entire content of which is hereby incorporated by reference.

Method and apparatus for rejection of noise and interference from a received combination signal by estimation of the desired signal having in addition to noise and interference been distorted by a communication channel through which the modulated transmitted desired signal has been passed.

DESCRIPTION OF BACKGROUND ART

In digital communication systems a transmitted signal is normally encoded, modulated and transmitted over a communication channel. The signal is sent in form of pulses that can be detected either 0 and 1 and given combinations of these "bits" form symbols with different meanings. One or more signal sequences sent in a packet data stream is called a "burst".

The information signal is sent by modulation of a carrier wave. Different modulation methods exist, of which the most usual are based on amplitude, frequency and/or phase modulation.

It is advantageous to describe different modulation forms by a complex signal representation. The complex signal represents the real physical bandpass signal in an equivalent lowpass representation. Essential features of the different modulation forms can then be represented geometrically. For example in one-dimensional modulation, the signal constellation points are located on a straight line.

Furthermore, there is a difference between linear modulation (different forms of amplitude modulation) and constant envelope modulation (angle-, phase and frequency modulation). However, almost all modulation methods used in mobile telephony can be interpreted as linear modulation with some modifications. In linear modulation, the modulator and the demodulator carry out some signal handling functions to send information by modulation of a carrier wave.

Whatever the physical medium used for transmission of the signal is, the essential feature is that the channel distorts the signal in different ways. The distorted signal is further corrupted by noise and interference. At the receiver, the signal is reconstructed and demodulated. The reconstructed signal is processed by channel and source decoders to obtain a copy of the transmitted source signal.

In a receiver with only one antenna the demodulator normally tries to combat distortion caused by the communication channel and noise but neglects the effects of interference. In order to derive efficient algorithms, the noise is normally considered to be white. If the noise is not white, a noise whitening filter can be used but this is not normally done since the color of the noise is unknown.

Filtering structures can be used to perform interference rejection. Adaptive or non-adaptive algorithms can be used to adjust the parameters in these filtering structures so that the desired signal can be estimated. After the filtering structures, demodulators demodulate the estimated signal of interest.

There are two classes of methods for choosing the parameter values. Conventional methods rely on the knowledge of training sequences embedded in the desired signals, this knowledge being used to choose an initial setting for the coefficient values, typically according to a least-squares error criterion. In an adaptation by means of a training sequence, the received data are used to find the parameters. Blind methods use one or more properties of the interference or of the desired signals instead of training sequences. Conventional methods that use a known training signal are well known to those skilled in the art of signal processing and are described in the open literature of adaptive signal processing and adaptive filtering.

The desired signal is estimated by a sequence estimator, of which there are several versions known in the art. These estimators make use of algorithms to mathematically calculate the desired signal by using filter parameters.

The most common sequence estimator used in receiver structures is the Maximum Likelihood Sequence Estimator (MLSE). The MLSE is preferably implemented with the so-called Viterbi algorithm. A version of this algorithm is the Soft Output Viterbi Algorithm (SOVA), which improves the performance of the subsequent channel decoding of the signal. The Maximum A Posteriori (MAP) algorithm gives superior performance, but is computationally more difficult. In the Decision Feedback Equalizer (DFE), already decided symbols in the process are used to decide the current symbol. A compromise between MLSE and DFE in performance is the Decision Feedback Sequence Estimator (DFSE), where it is possible to make a trade-off between computational complexity and performance. In the case with more than one antenna, some receivers can also consider the interference.

The main drawback with existing one-antenna solutions is that the algorithms consider only noise. Meanwhile, many communication systems are interference limited. The problem is that when the properties of the interference do not fit the model of the noise for which the receivers were designed, the performance of the receivers is greatly degraded.

The Interference Rejection Combining (IRC) receiver combines the output from antennas while trying to minimize the effect of noise and interference. There is an algorithm in the literature that considers the interference as a colored process. In deriving this algorithm, it is assumed that the noise can be described as a white sequence passed through an Auto Regressive (AR) filter.

The following patent documents are presented as prior art solutions in interference cancellation by means of different filter structures and for estimation of the desired signal by selection of suitable filter parameters for the filter structures.

In WO 98/16021 there is presented prior art solution for extracting a signal of interest from plurality of spectrally and temporally overlapping signals containing digital data. The apparatus of this solution comprises different filters producing time shifted output signals, frequency shifted output signals and linear combining means for summing said output signals and to produce an estimate of said signal of interest.

WO 97/11544 makes use of a noise-predictive maximum-likelihood (NPML) data detection scheme operating on signal samples received via an equalizing filter.

EP 0782260 A2 presents an equalizer configuration for processing real-valued and complex-valued signal samples.

The development of the mobile communication today is towards more and more users, which leads to increasing interference. This means that it is of great importance to find better and better methods for interference rejection and cancellation all the time and that every advantage within this area is useful.

SUMMARY OF THE INVENTION

The object of the invention is a better method and apparatus of interference rejection that offers improvements in performance compared to prior art methods.

The methods and apparatus of the invention, which choose the values of the parameters in the filtering structures, are improved methods compared to prior art methods in that a significantly better performance is obtained. The method works with one or more antennas as well as with and without oversampling.

The method of the invention is mainly characterized in that the signal is received as a combination of noise, interference and the distorted desired signal through one or more antennas. The received signal is separated into a real and an imaginary part and the noise and interference component is modeled as a filtered process. By utilizing the combined structure of the signal thus obtained, an equation for the received signal is formed as a function of the desired signal distorted by the communication channel and the noise and interference component. Values for the filter parameters can then be selected in the equation, where after the desired signal can be estimated by calculation from the equation by means of the filter parameters selected.

The apparatus is mainly characterized by
a) means for receiving a signal as a combination of noise, interference and the distorted desired signal through one or more antennas,
b) means for separating the received signal into a real and an imaginary part,
c) means for modeling the noise and interference component as a filtered process,
d) means for forming an equation for the received signal as a function of the desired signal distorted by the communication channel and the noise and interference component by utilizing the signal structure obtained in steps b) and c),
e) means for selecting of values for the filter parameters in said equation,
f) means for estimating the desired signal by calculation from said equation by means of said filter parameters.

In the case when the symbol to be transmitted is one-dimensionally modulated in the complex plane, the present invention solves the interference problem by utilizing this inherent signal structure.

The desired signal has been one-dimensionally modulated by a sender and thereafter transmitted through a complex valued communication channel.

The received signal is known to be a combination of the transmitted desired signal and noise and interference. Thus, the distortion can be taken into consideration when estimating the desired signal. The distortion caused by the communication channel can be modeled mathematically. This model can include the distortion of the desired signal as well as the addition of the interference and noise. Thus, the distortion is taken into consideration by modeling the channel as a linear filter in said equation so that the output of the filter is formed as a product of the filter vector and the input signal vector, like in the following equation $$\tilde{x}(t) = \tilde{h}d(t) + \tilde{n}(t)$$

where the diacritical marks denotes that the entity to which it is attached is complex-valued. The received signal is separated into a real and an imaginary part, so that the received signal can be expressed as a function of the time t in the following form $$x(t) = hd(t) + n(t)$$

where the channel matrix has the following form $$h = \begin{bmatrix} h_{r0} & h_{r1} & \ldots & h_{rL} \\ h_{i0} & h_{i1} & \ldots & h_{iL} \end{bmatrix}$$

and $$x(t) = \begin{bmatrix} \operatorname{Re}(\tilde{x}(t)) \\ \operatorname{Im}(\tilde{x}(t)) \end{bmatrix}, n(t) = \begin{bmatrix} \operatorname{Re}(\tilde{n}(t)) \\ \operatorname{Im}(\tilde{n}(t)) \end{bmatrix}$$

and where x(t) is the received signal, d is the desired signal and n is the combined noise and interference term and the matrix h contains the channel coefficients. The channel coefficients model the distortion of the signal through the communication channel.

The noise can be modeled as a filtered process, for example as an AR-process, in which the noise is described in the following way $$n(t) = \sum_{k=1}^{K} A_k n(t-k) + e(t)$$

where A represents the filter parameters, K the number of the filter parameters, t is the time and e is a white noise vector.

Also other filter processes can be used in the invention, for example the MA-process, the mathematical equation of which is known and can be found in the open literature describing filter processes.

The channel coefficients and the filter parameters in the modeled process for the desired signal and the noise are calculated by means of a known training sequence from the equation formed by knowledge of the data sent by the signal in the training sequence and by knowledge of the statistical properties of the noise component e. There exist mathematical algorithms by which h and A can be calculated from the equation above when x is known (being the received signal) and when the statistical properties of e are known. Examples of such algorithms include least-squares and maximum likelihood methods.

After having selected the filter parameters and the channel coefficients, the desired signal is estimated mathematically by means of an equalization method using same type of algorithms mentioned above.

The equalization methods are carried out in a known manner for those skilled in the art and can for example be carried out by means of a sequence estimator. In mathematical terms, the desired signal can for example be estimated by maximum likelihood for the equation giving the received signal, whereby the value for the received signal giving the least error can be obtained by means of a mathematical algorithm. When the Viterbi algorithm is used, the desired signal can be obtained without being forced to calculate the received signal for all different values of the desired signal. The idea of the mathematical approach is that the received signal is recreated by means of the channel coefficients and the selected filter parameters and different values for the desired signal, where after the recreated value of the received signal is compared with the true value for the received signal to obtain error values for the received signal. The desired signal is then estimated by selecting the sequence giving the least error for the received signal.

The method of the invention can be repeated for each received symbol sequence.

As was mentioned before, there are different known filter process models that can be used in the invention to model the noise signal. These processes can be selected among filter processes usually used to estimate the desired signal itself. In an MA model, the signal is a weighted sum of delayed input components, while in an AR process the signal is a weighted sum of foregoing output values. The noise is preferably modeled as a white noise through an AR filter but also other filter processes can be made use of. An example of another alternative is the MA filter process.

The choice of the number of filter coefficients worth to be taken into consideration, i.e. the order of the AR process, can be estimated adaptively by means of known algorithms. One simple order estimation approach is to choose the largest order that gives a significant decrease in the prediction error. Another way to choose the proper model order is to use each estimated model to estimate a number of transmitted symbols and the corresponding error. The error for different model orders can be calculated recursively, i.e. the parameters calculated in the current step can utilize the parameters calculated in the previous step in order to simplify the computational complexity.

The method of the invention can be made computationally less complex by prefiltering. The basic idea with prefiltering is to decrease the time spread of the channel, thus reducing the complexity of the sequence estimator. The prefiltering can be made by known methods.

It is possible to gain some additional performance if oversampling is used. Oversampling means that the sampling is faster than the bit rate or the symbol rate. By introducing oversampling, more channels are obtained as we get more samples and mathematically this fact can be put in the equation in the term describing the length of the channel and the amount of samples.

Prior knowledge of the filter structures can also be used to reduce the amount of parameters. It is then primarily a question about the physical properties of the channel which are utilized in the equation.

Decision direction is also a well known method of improving the performance of the system. The concept is based on the idea that once all or some of the transmitted symbols are estimated, the values are used in a renewed estimation of the channel and filter parameters. These estimates are then used for renewed estimation of the transmitted symbols.

The received signal is preferably linearly modulated with a one-dimensional constellation in the method of the invention, but if the received signal has been non-linearly modulated, the signal can in some cases be de-rotated to obtain a linear modulation. One example of a modulation method that can be de-rotated is MSK (Minimum Shift Keying). Another example is GMSK (Gaussian MSK), which is the modulation scheme in GSM. Although GMSK is a non-linear modulation scheme and cannot be transformed into a linear one, it has been shown that it can be approximated to a linear one with good accuracy.

It has been observed through extensive simulations that in interference environments, the receiver described in the present invention offers substantial improvements in performance, primarily in the form of lower Bit Error Rates (BER), which in turn allows operation with much lower Carrier to Interference Ratios (CIR).

Simulation Results

The method of the invention is simulated for different values of the order of the AR process, namely K=1 and K=2. The invention is also simulated for an embodiment of the invention, wherein the order is chosen adaptively. The channel is a typical urban channel described in the GSM specification, and it is also the GSM system that is used for communication. White Gaussian noise is also added with a Eb/N0 value of 25 dB, where Eb is the energy per bit and N0 is the noise spectral power.

The results of the simulations are shown in FIG. 1, wherein the performance of the invention is compared to a conventional receiver. The result is shown as the BER as a function of the carrier to interference ratio (CIR). The conventional receiver used is a Viterbi algorithm with five taps. This conventional receiver is very similar to what is used in most state of the art solutions. It fulfills the demands in the GSM specification with a 2 dB margin. At a BER level of 3% the improvement with the method of invention is about 7 dB. It should be noted that this is an extremely large improvement. Normally an improvement of a fraction of a dB is considered worthwhile. The computational complexity when K=2 is about four times the conventional receiver. For the case K=1 the improvement is less than 2 dB. The adaptive method that automatically chooses the order of K performs very well also.

In the following, some preferred embodiments of the invention will be described by means of figures and particular mathematical calculation algorithms. One skilled in the art understands that the invention can also be performed with other equalization methods and filter processes than those presented in the figures and that the maximum likelihood criteria equations can vary. In other words, the details of the invention can vary within the scope of the claims.

BRIEF DESCRIPTION OF THE FIGURES AND PREFERRED EMBODIMENTS

FORMULAS 1–23 describe an estimation of the desired signal for the preferred embodiment of the invention.

The performance of the invention compared to a conventional receiver is displayed in FIG. 1.

Figure 2:
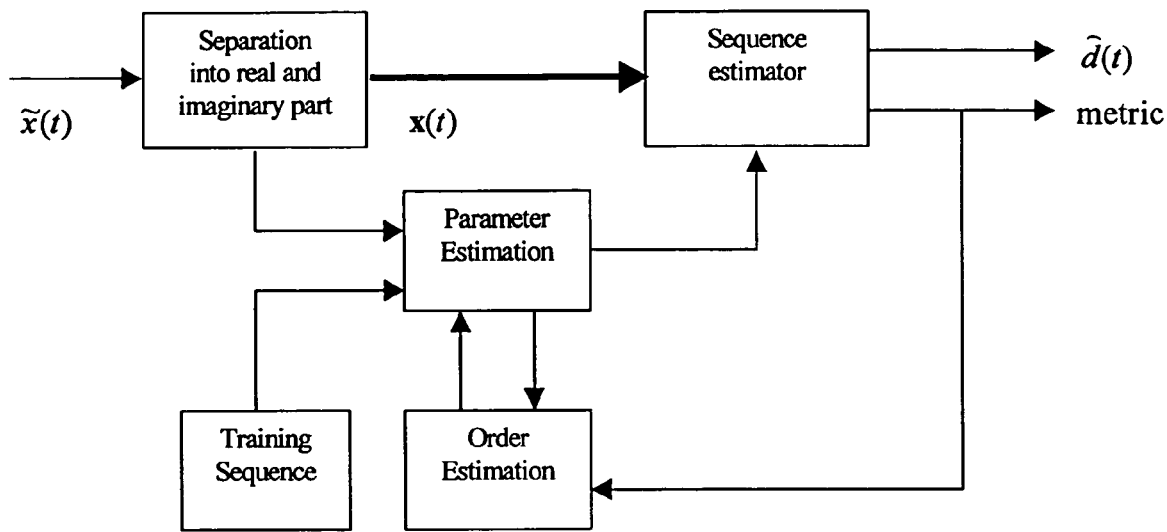

The main characteristics of the present invention are schematically described in FIG. 2.

DETAILED DESCRIPTION OF THE FIGURES AND PREFERRED EMBODIMENTS

An example of a detailed mathematical model for the estimation of the desired signal will now be presented by means of formulas 1–23. The mathematical calculations themselves are known by one skilled in the art and are used in the invention in which the desired signal is estimated by dividing the signal in a real and an imaginary part and by modeling the noise as a filtered process.

A transmitted signal d(t) signal, which is received in the method of the invention has been linearly modulated and passed through a complex communication channel h. The communication channel cause a distortion on the desired signal and as the received signal is a combination of the distorted desired signal, and the noise and interference component, the complex-valued signal x(t) can be formed as in equation 1.

The diacritical mark denotes that the corresponding entity is complex-valued and n(t) denotes the additive noise and interference. In equation 1, h is a vector of the form according to equation 2, where the subscript r and i denotes the real and imaginary part of the coefficients, respectively, and L is the length of the communication channel in bit periods.

The vector d(t) in equation 1 contains the delayed samples of the transmission symbols and can be expressed as in equation 3 where T denotes the transpose operator.

By separating equation 1 into its real and imaginary counterparts we get equation 4, where h can be expressed as a matrix according to equation 5, and x(t) and n(t) as in equations 6a and 6b, respectively.

It has to be noted that in equation 4, all entities are real-valued. The model in equation 4 has one input and two outputs. If h is not degenerate e.g. is identically equal to zero, d(t) can be estimated from both the real and imaginary part of the received signal (the first and the second row of equation 4). Hence it is clear that if d(t) is real-valued there is an inherent redundancy in the received signal. This is the redundancy that will be used to design an interference rejecting receiver.

In this embodiment of the invention, we choose to model the noise and interference as an AR process according to equation 7, where e(t) is a white noise with covariance matrix expressed as in equation 8.

Equation 7 can be rewritten as equation 9, where N(t) can be expressed as in equation 10 and $M_A$ as in equation 11.

An equation for the received signal will now be formed. Equation 4 can be written in an augmented form according to equation 12, where X(t) is defined similarly to equation 10 so that D(t) is written as in equation 13 and H as in equation 14.

By multiplying equation 12 with $M_A$ equation 15 is obtained.

If $M_A$ and H would be known, the source signal could be estimated by minimizing the maximum likelihood criteria according to equation 16. Different equalization methods exist for this estimation and usually this is done by means of a so called sequence estimator, known in the art. The MLSE (Maximum Likelihood Sequence Estimator) mentioned is implemented by a mathematical algorithm, preferably the Viterbi (or SOVA) algorithm.

In practice $M_A$ and H are not known and hence they must be estimated. If we have a training sequence, sent in connection with the desired signal and known by the receiver, i.e. d(t) is known for certain time-indices, the criterion in equation 17 can be used to find the parameters in $M_A$ and H as well as in Q. In general this is a nonlinear minimization which can be numerically cumbersome.

Embodiments of the invention with other filter structures and other orders of the process will now be described. Above the noise and interference has been described as an AR process. If a definition according to equation 18 is made by not considering the structure of B, the parameters can instead be estimated as in equation 19. These estimates and equation 20 can then be used in the estimation of the unknown transmitted symbols. The minimization problem in equation 19 is a simple linear least square problem, which is well described in the literature. When the simplification in equation 18 is introduced, we get a so called ARX model for the received signal. By the definition in equation 18, we have fixed the order of B to L+K. In one embodiment of the invention B is set to the order, which is not necessarily fixed to L+K. Normally, we would have M>or =L), but the invention is not limited to this case.

There will now be described an embodiment of the invention wherein an adaptive method is used to choose the order of the filter process. Assume for instance that the receiver operates in a pure noise environment, so that A1=A2=0, or equivalently n(t)=e(t). Then it is desirable to set the order of the AR model to K=0 in order not to describe the process with too many parameters. In other words, we want to avoid an over-parameterization of the problem, which might lead to a worse situation than the correct model. A version of the invention in which the model order is adaptive. There are many methods used to determine the model order available in the literature. Most of them rely on some criterion that is based on the magnitude of the estimation errors. These residuals reflect how well the model order fits the data used in the estimation. If we increase the model order, the magnitude of the residuals will always decrease. There is needed a test telling if this decrease is significant or not. In this embodiment of the invention, the magnitude of the residuals is given by the norm of the estimated of the noise covariance matrix Q. Many order estimation procedures have been described in the literature that apply to the present invention. Maximum likelihood methods, like the Final Prediction Error (FPE), Akaike's Information criterion (AIC) and its variants (such as the so called BIC and CIC) and Minimum Description length (MDL) are all applicable to the problem treated in the invention. Also sub optimal methods exist. These methods rely on the fact that the covariance matrix of the received signal has a certain rank structure that can be used to infer the order of the system to be identified. A major drawback with the order estimation methods is their computational complexity, why more practical methods are implemented. One simple algorithm that estimates the order of the model is outlined in the following. The algorithm is given for the case M=K+L, but can be generalized to general ARX models.

1) set K=0, $r_{-1}$=infinity
2) estimate the parameters of the systems with the current model order
3) evaluate $r_K=\|Q\|$
4) If $r_K/r_{K-1}$ is significantly smaller than 1 and K<$K_{max}$ increase K with one and go to step 2
5) Choose the K that gave the latest significant reduction of $r_K$ The term "significantly" in the algorithm above is defined by a certain threshold. This threshold is a trade-off between the performance in noise and interference environments. The smaller the threshold, the better the performance in noise.

A conceptually different method to choose the proper model order is to use each estimated model to determine a number of transmitted symbols. The resulting metric describing the estimation error from the Viterbi algorithm can then be used instead of the residual. The advantage of this method is that it provides a model order validation, which is independent of the data used in calculating the model.

Another way of having adaptive order selection is to implement the identification algorithm recursively in the order. For scalar systems this method is often referred to as the Levinson-Durbin algorithm (LDA). By extending the conventional LDA to multidimensional systems, it can be used in the present invention resulting in a significant saving in computations compared to standard techniques. The recursion is stopped when the residuals are small enough, thus minimizing the number of necessary operations.

The present invention is computationally more complex than a conventional MLSE receiver, i.e. a receiver wherein an equalization method is used. If it is necessary to reduce the computational complexity, pre-filtering is used. For illustration, M=K+L is considered and a general ARX model is used. The idea is to concentrate the main energy in B into fewer taps i.e. reduce the time dispersion of the filter and then to use the model in the equalizer. The first row of equation 15 is then expressed as equation 21, where the introduced notation has obvious definitions and $q^{-1}$ is the unit delay operator. A pre filter $F(q^{-1})$ is introduced and the filter of equation 21 and equation 22 is obtained. The remaining rows of eq 15 are similarly transformed. The choice of the number of remaining significant taps depends on a trade-off between how much we need to reduce the computational complexity and noise amplification. The determination methods are readily available in the signal processing literature.

An embodiment of the invention is to combine the model of equation 15 with other receiver structures to reduce the computational complexity, while keeping the loss in performance at a modest level. An example is the DFSE algorithm earlier mentioned. The DFSE is well described in the literature. And is directly applicable to equation 15 by one skilled in the art.

The invention can be used with one or more antennas. In equation 1 $\tilde{h}$ would then be an mxL+1 matrix where m is the number of antennas. Correspondingly, in equation 4, h would be an 2mxL+1 matrix and x(t) would have 2m elements.

It is possible to get some additional performance if oversampling is introduced. Oversampling in this case refers to sampling faster than the bit rate. Typically the oversampling factor, denoted by P, would be equal to 2 or 4, but other values are of course possible. The extension to handle the case with oversampling is very similar to the extension to multiple antennas decribed above. When oversampling with a factor P, $\tilde{h}$ in equation 1 would be a PxL+1 matrix. Row k of equation 1 would correspond to samples k, k+P, k+2P, . . . . Correspondingly, in equation 4, h would be a 2PxL+1 matrix and the vector x(t) would have 2P elements. By introducing oversampling we get more channels than with symbol rate sampling, which gives larger potential for the interference rejection. On the other hand, the higher the oversampling factor, the higher the correlation between adjacent channels (in h). Therefore there is a limit to what performance gain can be achieved with oversampling.

In one embodiment of the invention prior knowledge of the receiver/transmitter and pulse shaping filter is taken into consideration. In general, when the modulation is linear, the channel is the convolution between the physical channel and a combination of the receiver, transmitter and pulse shaping filters. This latter combined filters is known to the receiver and it is possible to use this information in the demodulation process. It has been shown that the composite channel vector can be written as in equation 23, where G is a matrix formed from the known filters and c is a vector with the parameters of the physical channel. This formulation is particularly useful when we use the oversampling described above. The reason is that the different channels all consist of the same physical channels, but differ only in the matrix G which can be computed in advance. Hence we have greatly reduced the number of parameters in the problem. Receivers using multiple antennas can also benefit from this kind of modeling. In this case the large dimensionality of the problem makes it important to keep the number of parameters to a minimum.

Decision direction is a well-known method to improve the performance of a receiver in a communication system. The concept is based on the idea that once we have estimated all (or a certain number) of the transmitted symbols, we make a hard decision about these symbols and use the decisions to re-estimate the model parameters with increased accuracy. This methodology, which can be repeated a desired number of times, is well documented in the literature. In combination with the method of the invention, decision direction is particularly useful. The reason is that in most practical communication systems, the number of training symbols is small in order not to waste information bandwidth. In the present invention, there are more parameters to estimate than in a conventional receiver, hence the quality of the parameter estimates can be significantly increased if decision direction is used.

The preferred embodiement of the invention is described in FIG. 2. The possibly over-sampled complex-valued signal, received with one or more antennas, is split into its real and imaginary part to obtain the vector in Equation 4. This vector is fed to the sequence estimator which determines the transmitted symbols using estimates of the parameters in the filters and of the model in Equations 15–18. These estimates are obtained using an available training sequence, and the number of parameters in the filters are obtained as an output of the order estimation algorithm. The model order can be obtained in several ways. One method described in the present invention relies on a test (described in 1–5 above) on the residuals from the parameter estimation, another method is decision direction from the metric obtained as an output of the sequence estimator; the model order giving the smallest metric when applied to the training sequence is used to estimate the data.

$$\tilde{x}(t) = \tilde{h} d(t) + \tilde{n}(t) \qquad 1$$

$$\tilde{h} = [h_{r0} + ih_{i0} \; h_{r1} + ih_{i1} \; \ldots \; h_{rL} + ih_{iL}] \qquad 2$$

$$d(t) = [d(t) d(t-1) \ldots d(t-L)]^T \qquad 3$$

$$x(t) = h d(t) + n(t) \qquad 4$$

$$h = \begin{bmatrix} h_{r0} & h_{r1} & \ldots & h_{rL} \\ h_{i0} & h_{i1} & \ldots & h_{iL} \end{bmatrix} \qquad 5$$

$$x(t) = \begin{bmatrix} \text{Re}(\tilde{x}(t)) \\ \text{Im}(\tilde{x}(t)) \end{bmatrix}, n(t) = \begin{bmatrix} \text{Re}(\tilde{n}(t)) \\ \text{Im}(\tilde{n}(t)) \end{bmatrix} \qquad 6$$

$$n(t) = \sum_{k=1}^{K} A_k n(t-k) + e(t) \qquad 7$$

$$E\{e(t) e^T(t)\} = Q \qquad 8$$

$$M_A N(t) = e(t) \qquad 9$$

$$N(t) = \begin{bmatrix} n(t) \\ \vdots \\ n(t-K) \end{bmatrix} \quad (10)$$

$$M_A = [I - A_1 \ldots -A_K] \quad (11)$$

$$X(t) = HD(t) + N(t) \quad (12)$$

$$D(t) = [d(t)d(t-1) \ldots d(t-L-K)]^T \quad (13)$$

$$H = \begin{bmatrix} h_{r0} & h_{r1} & \ldots & h_{rL} & 0 & \ldots & 0 \\ h_{i0} & h_{i1} & \ldots & h_{iL} & 0 & \ldots & 0 \\ 0 & h_{r0} & h_{r1} & \ldots & h_{rL} & \ldots & 0 \\ 0 & h_{i0} & h_{i1} & \ldots & h_{iL} & \ldots & 0 \\ \vdots & \vdots & \vdots & \vdots & \vdots & \vdots & \vdots \\ \vdots & \vdots & \vdots & \vdots & \vdots & \vdots & \vdots \\ 0 & \ldots & 0 & h_{r0} & h_{r1} & \ldots & h_{rL} \\ 0 & \ldots & 0 & h_{i0} & h_{i1} & \ldots & h_{iL} \end{bmatrix} \quad (14)$$

$$M_A X(t) = M_A HD(t) + e(t) \quad (15)$$

$$\{d(t)\} = \arg \min \|M_A X(t) - M_A HD(t)\|^2_{Q^{-1}} \quad (16)$$

$$\{M_A, H, Q\} = \arg \min \|M_A X(t) - M_A HD(t)\|^2_{Q^{-1}} \quad (17)$$

$$B = M_A H \quad (18)$$

$$\{M_A, B, Q\} = \arg \min \|M_A X(t) - BD(t)\|^2_{Q^{-1}} \quad (19)$$

$$\{d(t)\} = \arg \min \|M_A X(t) - BD(t)\|^2_{Q^{-1}} \quad (20)$$

$$y(t) = B_1(q^{-1})d(t) + e_1(t) \quad (21)$$

$$F(q^{-1})y(t) = F(q^{-1})B_1(q^{-1})d(t) + F(q^{-1})e_1(t) \quad (22)$$

$$Gc \quad (23)$$

We claim:

1. A method of rejection of noise and interference from a received combination signal by estimation of a desired signal having in addition to noise and interference been distorted by a communication channel through which the desired signal has been passed, comprising the following steps:
    a) receiving a signal as a combination of noise and interference components and the distorted desired signal through one or more antennas;
    b) separating the received signal into a real part and an imaginary part;
    c) modeling the noise and interference component as a filtered process using a model for colored noise;
    d) forming an equation for the received signal as a function of the desired signal distorted by the communication channel and the noise and interference components by utilizing the real and imaginary parts and the noise and interference components obtained in steps b) and c);
    e) selecting of values for filter parameters in said equation; and
    f) estimating the desired signal by calculation from said equation by means of said filter parameters;
    wherein the distortion caused by the communication channel is taken into consideration by modeling the channel as a linear filter coefficient in said equation;
    wherein said filter parameters and the channel coefficient are calculated by means of a known training sequence from the equation formed in step d) by knowledge of the data sent by the signal in said training sequence and by knowledge of the statistical properties of the noise component, whereafter the desired signal is estimated mathematically by means of an equalization process;
    wherein in a mathematical algorithm for calculating the filter parameters and the channel coefficient, the number of the filter parameters is selected by an order estimation procedure; and
    wherein an adaptive order estimation procedure is used to choose an order of the filter process.

2. The method of claim 1, wherein said adaptive order estimation procedure comprises using a threshold test on a residual estimation error.

3. The method of claim 2, wherein the adaptive order estimation procedure comprises a recursive implementation of an identification algorithm.

4. The method of claim 1, further comprising the steps of using estimated models of different orders to equalize a number of symbols and determine a corresponding metric and using said metric to select said order of the filter process.

5. A method of rejection of noise and interference from a received combination signal by estimation of a desired signal having in addition to noise and interference been distorted by a communication channel through which the desired signal has been passed, comprising the following steps:
    a) receiving a signal as a combination of noise and interference components and the distorted desired signal through one or more antennas;
    b) separating the received signal into a real part and an imaginary part;
    c) modeling the noise and interference component as a filtered process using a model for colored noise;
    d) forming an equation for the received signal as a function of the desired signal distorted by the communication channel and the noise and interference components by utilizing the real and imaginary parts and the noise and interference components obtained in steps b) and c);
    e) selecting of values for filter parameters in said equation; and
    f) estimating the desired signal by calculation from said equation by means of said filter parameters;
    wherein the distortion caused by the communication channel is taken into consideration by modeling the channel as a linear filter coefficient in said equation;
    wherein said filter parameters and the channel coefficient are calculated by means of a known raining sequence from the equation formed in step d) by knowledge of the data sent by the signal in said training sequence and by knowledge of the statistical properties of the noise component, whereafter the desired signal is estimated mathematically by means of an equalization process;
    wherein in a mathematical algorithm for calculating the filter parameters and the channel coefficient, the number of the filter parameters is selected by an order estimation procedure; and
    wherein a suboptimal method is used for estimation of the desired signal.

* * * * *

UNITED STATES PATENT AND TRADEMARK OFFICE
CERTIFICATE OF CORRECTION

PATENT NO. : 7,092,463 B1
APPLICATION NO. : 09/549559
DATED : August 15, 2006
INVENTOR(S) : Cedervall et al.

It is certified that error appears in the above-identified patent and that said Letters Patent is hereby corrected as shown below:

On the title Page, in Field (30), under "Foreign Application Priority Data", in Column 1, Line 1, delete "9901384" and insert -- 9901384-9 --, therefor.

In Fig. 1, Sheet 1 of 2, delete "Averaae" and insert -- Average --, therefor.

In Column 1, Line 20, after "0" delete "and" and insert -- or --, therefor.

In Column 7, Line 66, after "=L" delete ")".

In Column 10, Line 41, Equation No. 2, delete "$h=[h_{r0}+ih_{i0}h_{r1}+ih_{i1} \ldots h_{rL}+ih_{iL}]$" and insert -- $h = [h_{r0} + ih_{i0} \; h_{r1} + ih_{i1} \; \ldots \; h_{rL} + ih_{iL}]$ --, therefor.

In Column 12, Line 54, in Claim 5, delete "raining" and insert -- training --, therefor.

Signed and Sealed this

Twenty-fifth Day of December, 2007

JON W. DUDAS
*Director of the United States Patent and Trademark Office*